United States Patent

[11] 3,619,132

| [72] | Inventors | Hans-Joachim Mann<br>Brilon;<br>Klaus Simon, Rheinfelden; Robert Richter, Hochkirchen; Friedrich Bittner, Bad Soden; Heinrich Burkhardt, deceased, late of Bruhl by Sigrid Burkhardt, heir; Jacob Gensheimer, Frankfurt, all of Germany |
|---|---|---|
| [21] | Appl. No. | 771,188 |
| [22] | Filed | Oct. 28, 1968 |
| [45] | Patented | Nov. 9, 1971 |
| [73] | Assignee | Deutsche Gold-und Silber-Scheideanstalt vormals Roessler<br>Frankfurt am Main, Germany |
| [32] | Priority | Oct. 27, 1967 |
| [33] | | Germany |
| [31] | | P 15 92 329.2 |

[54] PROCESS FOR THE PRODUCTION OF ALKALI CYANIDES
9 Claims, 1 Drawing Fig.

[52] U.S. Cl.................................................. 23/79, 23/273

[51] Int. Cl.................................................. C01c 3/08, B01d 9/00
[50] Field of Search........................................ 23/79

[56] References Cited
UNITED STATES PATENTS
2,708,151  5/1955  McMinn, Jr.................  23/79
FOREIGN PATENTS
1,009,345  11/1965  Great Britain..............  23/79

Primary Examiner—Oscar R. Vertiz
Assistant Examiner—Hoke S. Miller
Attorney—Cushman, Darby & Cushman ABSTRACT: Alkali cyanides are prepared from carbon dioxide free impure hydrocyanic acid gases by reacting with aqueous alkali hydroxide, e.g. NaOH or KOH, in a first step at subatmospheric pressure to form the alkali cyanide and then the alkali cyanide is crystallized in a second step at a still lower pressure.

PATENTED NOV 9 1971
3,619,132
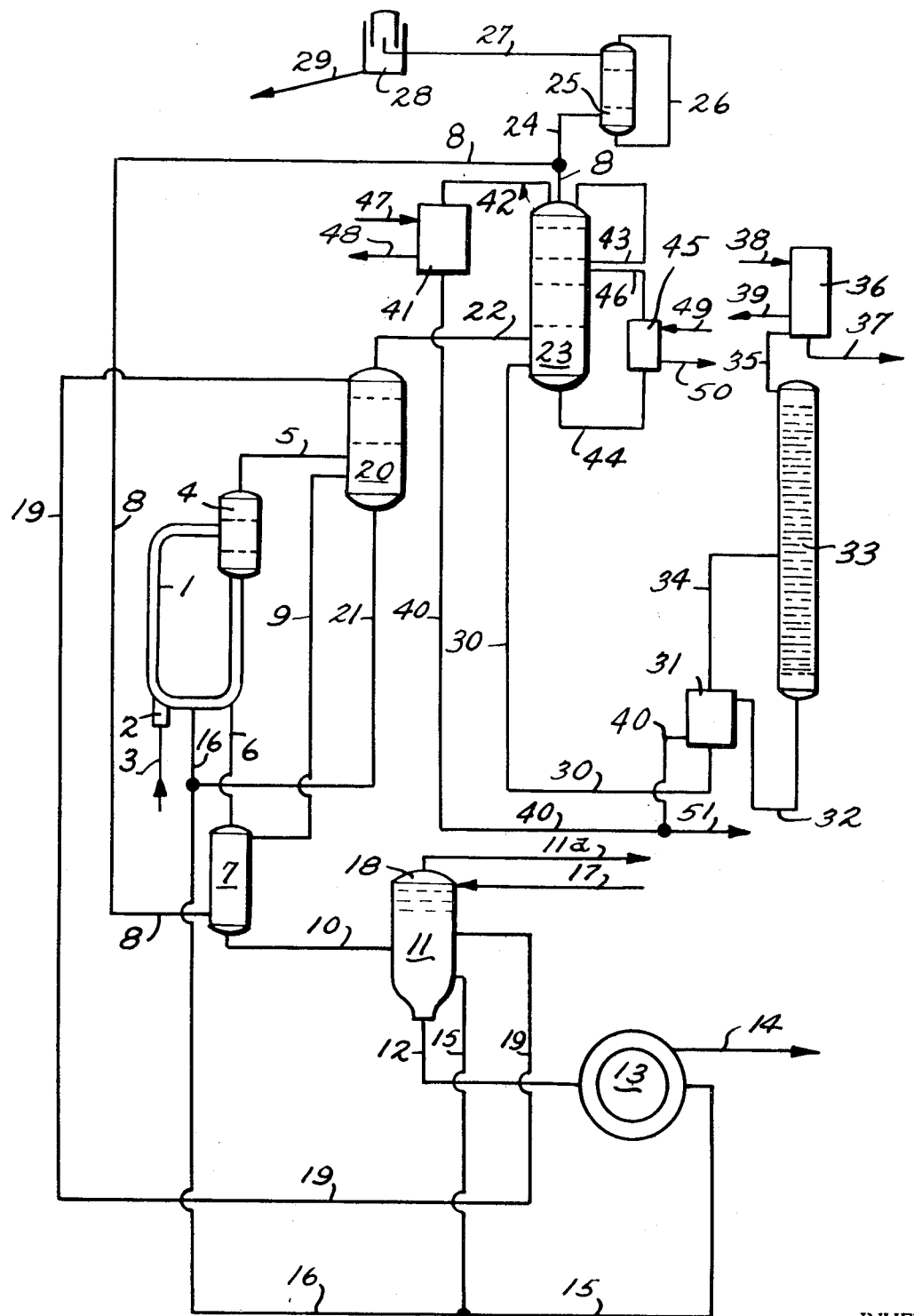
INVENTORS
HANS-JOACHIM MANN
KLAUS SIMON
ROBERT RICHTER
FRIEDRICH BITTNER
HEINRICH BURKHARDT
JACOB GENSHEIMER
BY
Cushman, Darby & Cushman
ATTORNEYS

PROCESS FOR THE PRODUCTION OF ALKALI CYANIDES

Alkali cyanides are known to be produced by the neutralization of hydrocyanic acid (HCN) with alkali hydroxide. For this purpose, the hydrocyanic acid is added both in the form of a gas and also as a liquid and the alkali hydroxide is added in aqueous solution. The process can be carried out so that either solid alkali cyanide crystals form or are precipitated from the aqueous solution during evaporation.

For most technical processes, pure hydrocyanic acid is used which is produced commercially by various processes, for example from carbon monoxide and ammonia, from formamide or from hydrocarbons and ammonia. The thus obtained crude hydrocyanic acid contains in almost all cases, in addition to other gases, ammonia. Since hydrocyanic acid polymerizes in the presence of alkaline reacting materials, it is necessary to remove the unreacted ammonia before the isolation of the hydrocyanic acid.

This purification is carried out most frequently with an acid wash utilizing sulfuric acid or phosphoric acid. As a result, large amounts of ammonium sulfate or phosphate produced as an undesired byproduct. There are also described other processes for separating HCN and $NH_3$ by recovery of the ammonia. For example, U.S. Pat. No. 2,590,146 describes the separation with the help of a boric acid-pentaerythritol complex. However, this creates a corrosion problem and these processes, as all of the processes developed for recovery of Ammonia with acid wash liquid, require a lot of energy. According to U.S. Pat. No. 3,112,177, the separation of HCN and $NH_3$ is carried out in a reaction tower in which water is introduced into the top of the tower, the reaction gas mixture is introduced into the middle and $CO_2$ is fed to the bottom of the tower. This process is very complicated.

It has already been tried, therefore, to use impure cyanic acid containing reaction gas for the production of alkali cyanide. Thus, in U.S. Pat. No. 2,742,344, there is described a process in which a carbon dioxide and ammonia containing hydrocyanic acid gas is used for the neutralization of an alkaline solution. As a result, in addition to the alkali cyanide, alkali carbonate precipitates which must be separated as calcium carbonate by the addition of an exact dosage quantity of calcium cyanide.

According to the present invention, it has been found that the alkali cyanide formation as well as the concentration of the reaction mixture can be carried out by reaction of carbon dioxide free hydrocyanic acid with aqueous alkali hydroxide solution under energetically favorable conditions, if the cyanide formation and concentration, that is the crystallization of the reaction mixture, are carried out spacially separated in two different pressure steps, both of which are carried out in high vacuum below atmospheric pressure, and the crystallization step is carried out under less pressure than the cyanide formation step.

The total pressure of the gases and vapors consists during the cyanide formation, i.e., the absorption of the hydrocyanic acid from the gas mixture, of the partial pressure of the inert gases, the saturation pressure of water and, if necessary, the partial pressure of the ammonia.

The sensible quantity of heat introduced in the cyanide formation, as well as the reaction heat set free by the hydrocyanic acid absorption, are suitably utilized for the evaporation of a portion of the water brought in with the alkali solution. The saturation pressure depends on the total pressure at which the reaction is carried out and thus determines the boiling temperature, unless cooling is employed. The temperature should be such that the saponification of the cyanide to the formate remains small. Thus, the temperature should be below 70° C. It must, however, be above the temperature at which alkali cyanide hydrate crystallizes out, for example, in the case of sodium cyanide, above 35° C.

According to the hydrocyanic acid content of the gas mixture and coupled therewith the quantity of heat removed through the water evaporation, there is at each selected temperature a fixed total pressure of the mixture of inert gas, steam and, in a given case, ammonia. This mixture should be compressed at least at atmospheric pressure, whereby the compression work is greater the lower the pressure in the reactor is selected and whereby the accompanying reaction temperature is depending on the pressure in the reactor. If the gas mixture which is driven off contains ammonia, the ammonia — suitably after compression — is recovered in the known manner by water washing.

The reacted mixture in the alkali cyanide formation step, which still contains about 2 percent free lye, is led from the reaction apparatus into the crystallization apparatus. The reaction solution is concentrated there with a supply of heat under a lower pressure than in the cyanide formation step. The temperature also should not exceed 70° C. to avoid hydrolysis of the cyanide. Since the inert gases no longer contribute to the total pressure, the saturation pressure of the water alone is decisive. At the same temperature in both steps, the crystallization step is carried out under a lower pressure than the cyanide forming step. The lower temperature limit is in the same way determined by the crystallization temperature of the Hydrate. The concentration is continued until the solid content reaches about 10 percent. The cyanide crystals precipitating during the concentration are removed with the aid of customary mechanical separating apparatus, such as filters and centrifuges, and freed from residual moisture in a known way in a rapid drier (drum drier or flow drier). The filtrate is returned to the crystallizer or partly into the cyanide forming step.

The pressure in the reactor generally is 200 to 700 Torr. However, the highest pressure in the crystallizer is 70 Torr, the lowest pressure being 15 Torr. In itself, it is possible to use a higher pressure than 70 Torr in the crystallizer. However, with the higher pressure the temperature rises so high that there is danger of considerable saponification of the cyanide.

There can be used any crude, carbon dioxide free gas. Preferably, there is used crude gas from the methane-ammonia direct synthesis of hydrocyanic acid containing 10 to 30 volume percent of hydrocyanic acid (HCN).

As alkali hydroxide, preferably there are used sodium and potassium hydroxides. The aqueous alkali solution generally has a concentration of 30 to 70 percent, preferably 50 percent, by weight.

All apparatus are suitable as reaction apparatus for the cyanide formation step which are customary for the reaction of gases with crystallizing liquids, for example, jet washers or bubble column reactors.

As crystallizers there are preferred the known apparatus with compulsory circulation, among others the ones by which coarse crystals are excluded and the fine crystals are further retained in the crystallizer (Ullman, 1951, Vol. 1, page 554).

The improvement according to the invention's process is found in the simplification of the technical process and in the favorable energy economy. Since impure hydrocyanic acid is introduced to obtain purest alkali cyanide (percentage purity higher than 98 percent), apparatus and energy for purification are no longer necessary. Furthermore, by the spacial separation of the cyanide formation and the crystallization, the entire inert gases and ammonia are separated at low vacuum, whereby compression energy is saved. Although the pressure employs in the crystallization step is less than that used in the reaction step, being, however, in the same range of coarse vacuum, this pressure is easy to obtain.

Besides, it is possible through the spacial separation of the cyanide formation step and the step of crystallization of the solution to produce a saturated alkali cyanide solution by a feeding of crude hydrocyanic acid gas and at the same time to obtain large cyanide crystals from the saturated reactor liquor by transfer of this solution to the crystallizer for breeding large crystals.

It is also valuable that the removal and recovery of ammonia from the reactor is possible without collection of undesired byproducts such as ammonium sulfate or ammonium phosphate. The recovered ammonia can, after absorption in water, be dehydrated in a simple manner, for example, by distillation, preferably under pressure, and again employed in the hydrogen-cyanide production.

It is known to accomplish cyanide formation and crystallization in an apparatus by use of pure hydrocyanic acid. During this process the sensible heat of the introduced hydrocyanic acid and the neutralization heat produced by the formation of cyanide are used for the evaporation of a part of the water, i.e., for the concentration of the reaction mixture.

This working of the process is not practical, however, in charging crude hydrocyanic acid, since, as stated, the gas pressure from the reaction mixture is composed not only of water vapor alone but also of the partial pressure of the inert gases and the ammonia (if present). Consequently a concentration of the reaction mixture in a single apparatus is not possible under favorable energy conditions since the compression energy is too high, but instead it is necessary to employ the two step process of the invention to obtain the favorable energy conditions.

The invention will be understood best from a consideration of the drawings, wherein the singe FIG. is a schematic flow diagram.

Referring more specifically to the drawings, crude cyanic acid gas 3 is introduced into bubble column reactor 1 through inlet 2. The cyanic acid reacts with the free aqueous sodium hydroxide solution circulating in the reactor 1. The cyanide solution is separated from the HCN free residue gases in separator 4. The residue gases are introduced via conduit 5 into the NaOH washer 20.

A part of the reaction solution corresponding to the height of production is pumped via conduit 6 into desorber 7. There dissolved ammonia, according to the partial pressure in the reaction solution, is driven off countercurrently with ammonia free residue gases. These residue gases are withdrawn from the head of absorption tower 23 via conduit 8. The residue gases laden with ammonia are fed back to the soda lye washer 20 via conduit 9 and to the $NH_3$ absorption tower 23 via conduit 22.

The reaction solution drained from the desorber 7 is pumped via conduit 10 into the crystallizer 11 and is concentrated there by evaporation. From the crystallizer 11 the crystal slurry is pumped via conduit 12 to the rotary filter 13. The crystal cake which is formed there goes via line 14 to a drying apparatus (not shown) operating in a known manner.

The filtrate accumulating in rotary filter 13 only in part is delivered by circulation to crystallizer 11 via conduit 15. The filtrate is fed back to the neutralization in reactor 1 via conduit 16 in such quantities, that the desired NaOH content in the crystallizer solution is maintained. The solution is evaporated in known manner in crystallizer 11 and the corresponding vapors drawn off via conduit 11a.

The soda lye necessary for the reaction is used to remove traces of HCN from the inert gases before introduction into reactor 1. The soda lye arrives via conduit 17 to the washing plates 18 in crystallizer 11. It is drawn off via conduit 19 and pumped to the top of NaOH washer 20. The inert gases are freed from traces of hydrocyanic acid in washer 20 by this soda lye wash. After this the soda lye arrives in the reactor circulation via conduits 16 and 21. The HCN free residue gases coming from washer 20 are introduced via conduit 22 into the $NH_3$ absorption tower 23. Here the $NH_3$ is absorbed by cold water. The $NH_3$ free residue gases arrive through conduits 8 and 24 in the safety washer 25. There the last traces of ammonia are absorbed by sulfuric acid, while there is pumped via conduit 26a predetermined quantity of sulfuric acid which is introduced into safety washer 25 counter current to the gas. The residue gases were conducted via conduit 27 into the gasometer 28. From there they can be supplied for further use via conduit 29.

The ammonia-water drained off from the absorption tower is pumped via line 30 to the preheater 31 and warmed in counter current flow to the sump water that is removed from the sump of the pressure distillation column 33 and is fed via conduit 32 to the preheater 31. The ammonia-water arrives from the preheater 31 via conduit 34 in the pressure distillation column 33, which is operated in known manner. At the top of column 33, water free ammonia goes via conduit 35 to a condenser 36. The fluid water free ammonia can be withdrawn therefrom via conduit 37. Cooling water is led into the condenser 36 via conduit 38 and is later removed via conduit 39.

The sump water, after leaving the heat exchanger 31, is led via conduit 40 to the brine cooler 41, cooled there and sent via conduit 42 to the top of absorption tower 23. The cold water is pumped in a circle in the upper part of the absorption tower 23 via conduit 43. The forming ammonia-water mixture is removed from the sump of the absorption tower 23, pumped via conduit 44 to the cooler 45 and from there returned via conduit 46 to the absorption tower 23. Cooling brine flows through the brine cooler 41 via inlet conduit 47 and outlet conduit 48. The cooler 45, however, has supplied cooling water through inlet conduit 49 which leaves through outlet conduit 50.

The quantity of water carried along with the residue gases from reactor 1 is only partially condensed in absorption tower 20. The remainder of the water is condensed in absorption tower 23. The quantity of sump water is maintained constant to the plant capacity for $NH_3$ recovery by draining off via conduit 51 to the sewer.

EXAMPLE 1

In an apparatus of the type described above made of stainless steel, there were introduced into the reactor 2,000 parts by weight of saturated NaCN solution with an excess of free NaOH of 2 to 4 percent by weight. The washer 20 situated above the reactor was filled with 3,760 parts by weight of 50 percent NaOH. At a pressure of 400 Torr and a temperature of 65° C., which were kept constant, there were introduced into the reactor about 1,930 parts by weight of reaction gas having the following composition by weight.

| | |
|---|---|
| hydrocyanic acid | 65.8 % |
| water | 17.4 % |
| ammonia | 8.3 % |
| methane | 6.8 % |
| nitrogen | 1.7 % |

The reaction gas was withdrawn directly from a working production installation of a methane-ammonia direct synthesis and led into the reactor at about 150° C.

The HCN part of the gases reacted with the excess soda lye on hand in the reaction liquid, while ammonia was driven off together with the inert gases. The quantity of gas flowing off amounted to 660 parts by weight per hour.

The gas passed to the NaOH washer situated over the reactor whereby unreacted hydrocyanic acid was absorbed. The HCN free inert gases together with $NH_3$ and steam arrived in an absorption tower in which there was applied hourly at the top 1,640 parts by weight of cooling water as well as 39,000 parts by weight per hour of cooled wash water in two separate circuit. The inert gas (543 parts by weight per hour) consists of steam, methane, nitrogen, hydrogen and traces of ammonia. The traces of ammonia are removed in a safety washer, collected in a gasometer and used further. From the absorption tower there are conducted hourly 1,800 parts by weight to a distillation installation for the purpose of $NH_3$ recovery. From the mixture taken from the reactor there were withdrawn about 10,000 parts by weight per hour, which were introduced into a vacuum crystallizer working at a pressure of about 50 Torr and at 54° C. The vapor was removed in known manner and condensed.

About 23,000 parts by weight of crystal sludge were drawn off from the crystallizer per hour, the NaCN crystals clarified on a rotary filter and the mother liquor introduced into the reactor as well as into the crystallizer. In this way there were recovered 2,300 parts by weight of sodium cyanide per hour, which were dried in known manner. The sodium cyanide was of 99 percent purity.

Unless otherwise indicated all parts and percentages are by weight.

What is claimed is:

1. In a process for producing pure alkali cyanide through reaction of aqueous alkali hydroxide solution with impure, ammonia containing, carbon dioxide free hydrocyanic acid, the improvement comprising carrying out the cyanide formation and crystallization in separate places at two different pressures substantially below atmospheric, the pressure in the crystallization step being less than the pressure in the cyanide formation step, the pressure in the cyanide formation step being not over 700 Torr, the temperature in the cyanide formation step being below 70° C. and above the temperature at which the alkali cyanide crystallizes out and the temperature in the crystallization step being below 70° C.

2. A process according to claim 1 wherein the alkali hydroxide is either sodium hydroxide or potassium hydroxide.

3. A process according to claim 2 wherein the pressure in the cyanide formation step is between 200 and 700 Torr and the pressure in the crystallization step is not over 70 Torr.

4. A process according to claim 3 wherein the hydrocyanic acid in gaseous form in admixture with ammonia is introduced into the aqueous alkali hydroxide solution and the ammonia is separated from the reaction mixture in gaseous form.

5. A process according to claim 4 wherein the hydrocyanic acid content of the gases introduced to the alkali hydroxide solution is 10 to 30 percent by volume.

6. A process according to claim 5 wherein the gases are those from the methane-ammonia direct synthesis of hydrocyanic acid.

7. A process according to claim 6 wherein the pressure in the alkali cyanide formation step is between 200 and 700 Torr and the pressure in the crystallization step is not over 70 Torr.

8. A process according to claim 7 wherein the temperature in both the cyanide formation step and the crystallization step is between 35° and 70° C.

9. A process according to claim 1 wherein the pressure in the cyanide formation step is at least 130 Torr above the pressure in the crystallization step.

* * * * *